DE WITT C. COOKINGHAM & J. H. HERTNER.
AUTOMOBILE RUNNING GEAR.
APPLICATION FILED NOV. 30, 1910.

1,007,645.

Patented Oct. 31, 1911.

3 SHEETS—SHEET 1.

DE WITT C. COOKINGHAM & J. H. HERTNER.
AUTOMOBILE RUNNING GEAR.
APPLICATION FILED NOV. 30, 1910.

1,007,645.

Patented Oct. 31, 1911

3 SHEETS—SHEET 2.

DE WITT C. COOKINGHAM & J. H. HERTNER.
AUTOMOBILE RUNNING GEAR.
APPLICATION FILED NOV. 30, 1910.

1,007,645.

Patented Oct. 31, 1911.

3 SHEETS—SHEET 3.

WITNESSES:

INVENTORS
De Witt C. Cookingham
and John H. Hertner
BY
J. B. Fay
ATTORNEY

UNITED STATES PATENT OFFICE.

DE WITT C. COOKINGHAM AND JOHN H. HERTNER, OF CLEVELAND, OHIO, ASSIGNORS TO THE RAUCH AND LANG CARRIAGE COMPANY, OF CLEVELAND, OHIO, A CORPORATION OF OHIO.

AUTOMOBILE RUNNING-GEAR.

1,007,645.

Specification of Letters Patent. Patented Oct. 31, 1911.

Application filed November 30, 1910. Serial No. 594,981.

*To all whom it may concern:*

Be it known that we, DE WITT C. COOKINGHAM and JOHN H. HERTNER, citizens of the United States, and residents of Cleveland, county of Cuyahoga, and State of Ohio, have jointly invented a new and useful Improvement in Automobile Running-Gears, of which the following is a specification, the principle of the invention being herein explained and the best mode in which we have contemplated applying that principle, so as to distinguish it from other inventions.

Our present invention, relating as indicated to running gear for automobiles, or like self-propelled vehicles, has more particular regard to improved means whereby the live rear axle in a shaft-driven automobile may be connected with the frame or chassis of the vehicle, so as to allow the springs full freedom of action and still provide adequately for the turning torque imparted to the casing in which such axle is housed. It will be understood, of course, that the use of the improvements in question is not of necessity limited to the specific type of vehicle just referred to, but may also be employed on chain-driven vehicles, since the casing that houses the rear axle is subjected to even a greater torque where the brakes are applied to the wheels, than it is by the mere reaction of the differential, in the case of a shaft-driven vehicle. This same braking torque, to be sure, is present in the latter, where the brakes are applied in the same fashion. With a view to accomplishing the ends indicated above, said invention, then, consists of the means hereinafter fully described and particularly pointed out in the claims.

The annexed drawings and the following description set forth in detail certain mechanism embodying the invention, such disclosed means constituting, however, but several of the various mechanical forms in which the principle of the invention may be used.

Figure 1:
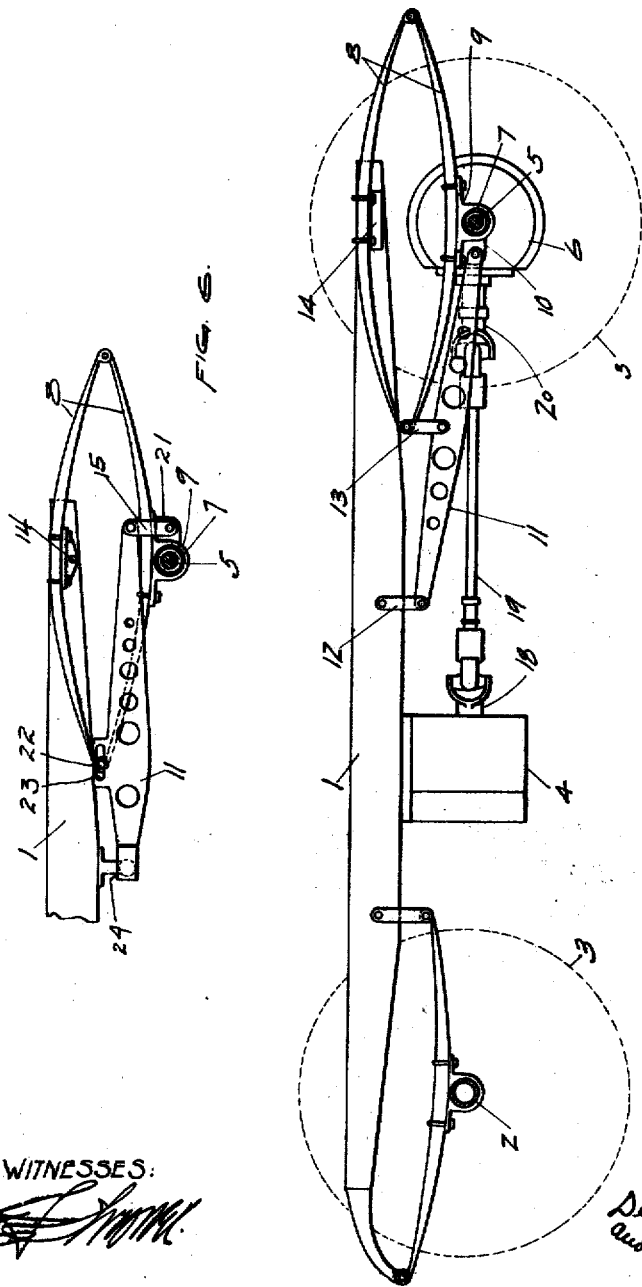

In said annexed drawings:—Figure 1 is a side elevational view of an automobile chassis embodying our present improved construction of running gear; and Figs. 2, 3, 4, 5 and 6, respectively illustrate modifications in the construction of such running gear.

Referring first of all to the form of construction shown in Fig. 1, it may be observed that the chassis 1 is shown in outline only and as of typical form; particularly the manner in which it is supported upon the front axle 2, is a matter of no concern in this connection. The wheels 3, moreover, are shown merely in outline; while as to the motor 4, although this is here shown as an electric motor suspended in conventional fashion from the under side of the chassis, it will be understood that any suitable type of motor and driving connections therefrom to the rear axle 5 may be substituted. In the present case, said rear axle is a live axle, driven through a differential (not shown) that is of the usual construction and housed in an enlargement 6 of the casing 7, within which such axle is contained. The rear springs 8, the manner of mounting which is of present interest, are seated upon the same casing 7, only one such spring, of course, appearing in each of the several views illustrating the diverse ways in which such attachment may be effected, while still utilizing the principle of the invention. This spring, however, is in each case a full elliptic spring, which, as is well known, has superior riding qualities to any other spring of the same dimensions and compactness of structure. In such Fig. 1, this spring is securely clamped to the casing 7 by means of a seat 9 of usual construction, save for the provision on its forward side of a lug 10, that provides means for attaching thereto one end of a strut member in the form of a rod or bar 11. This rod, in the form thus first illustrated, is of the same length as the spring, and is attached at its forward end by means of a link 12 to the side member of the chassis, or at some other suitable point thereon. The forward end of the spring is furthermore connected with said bar by means of a link 13, and since the length of the bar is, as stated, equal to that of the spring, the point of attachment of the latter thereto will be obviously midways between its two ends. Since, accordingly, the ends of a properly constructed full elliptic spring have just half the range of travel of the axle, the movement of the forward end will be in no wise interfered with by being thus attached to the bar 11, for the mid-point of the latter will have just half the range of travel of its rear end, which is secured, in effect, to the same axle upon which the spring is seated. There will, moreover, be no tendency manifested by the spring to rotate about its point 14 of attachment to the chassis, so that the latter may be made solid as shown. By reason of this bar, however, and its connection with both the forward end of the spring and with the chassis, any tendency of the spring, or rather of the casing 7, (which will first manifest such tendency) to rotate, owing to the re-action of the differential, or the application of the brakes, will be entirely prevented. At the same time such bar acts perfectly as a strut for the transmission of the driving strain to the vehicle in the overcoming of the inertia of the latter in starting and stopping.

Figure 2:
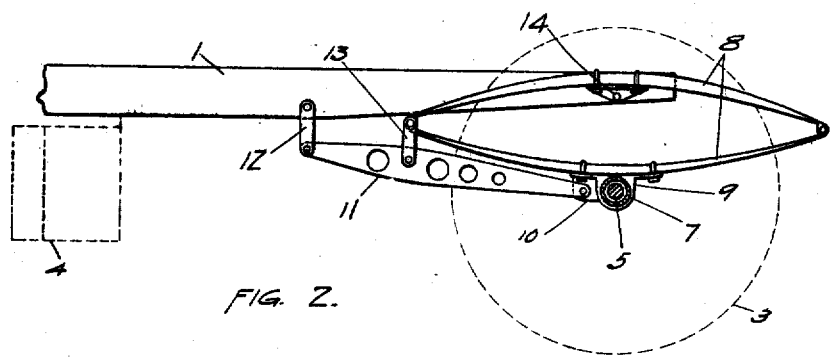
Figure 3:
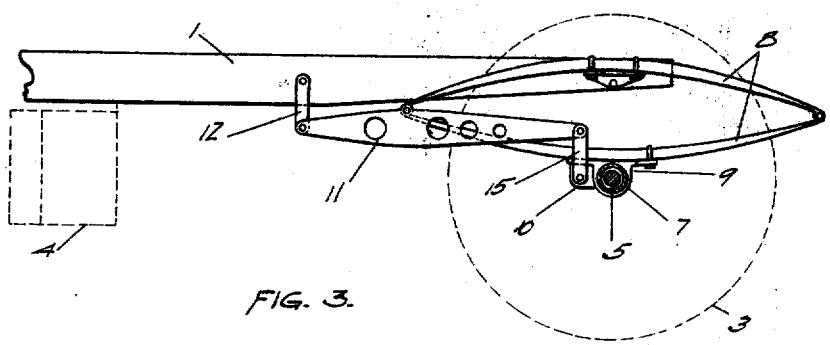

While the foregoing is the preferred construction, inasmuch as it permits of the rigid attachment both of the lower half of the spring to its seat and of the upper half thereof to the vehicle frame, under certain conditions met with in practice it is not feasible or desirable to employ as long a bar 11 as is necessary in order to accomplish this result. Where, accordingly, as illustrated in Fig. 2, it is desired to shorten the bar, this may be readily done without varying the mode of its attachment either to the front end of the spring or to the vehicle frame, links 12 and 13 being employed here as before. Inasmuch as, however, the distance between the point of attachment of the bar to the frame and the point of its attachment to the front end of the spring, is less than the distance between such latter point and the axle, the spring will have a slight tendency to rotate about its point 14 of attachment to the frame. Accordingly, such attachment is here made pivotal, as by passing a pin through the plate that is employed in clamping the leaves of the upper half of the spring together. The mode of operation, however, of this form of our invention is substantially the same as before, and, so far as the taking up of any torsional strain is concerned, is equally efficient. It is, furthermore, not necessary that the link connection be at the points shown in Figs. 1 and 2, viz. between the bar and the front end of the spring, and the vehicle frame, respectively; but if desired, the bar may be directly pivotally attached to the front end of the spring, in which event its rear end is connected with the spring seat by a link 15 as shown in Fig. 3. Owing to the inequality of the two sections of the bar lying on either side of its point of attachment to the front end of the spring, the latter requires to be pivotally attached to the frame, as in the case of the structure illustrated in Fig. 2. This observation also applies to Figs. 4 and 5. In such Fig. 4, the modification consists in the pivoting of the front end of the bar directly to the frame, or rather to a bracket 16 depending downwardly therefrom, instead of effecting such connection by means of link 12. In this case the linked connection between the front end of the spring and the bar is retained, and in addition the rear end of the bar is linked to the axle, just as in the case of Fig. 3.

Figure 5:
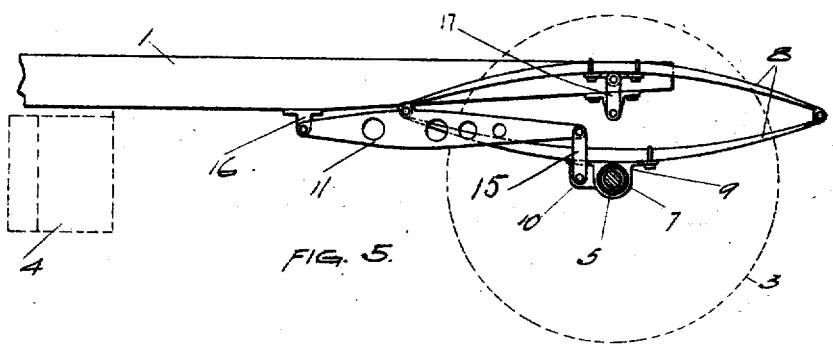

In Fig. 5, the bar 11 is shown as directly pivotally attached both to the frame of the vehicle and to the front end of the spring. Accordingly not only is a link 15 interposed in the connection between the rear end of such bar and the axle, but also a link 17 in the connection between the upper half of the spring and the vehicle frame so as to provide for the necessary freedom of movement.

Figure 4:
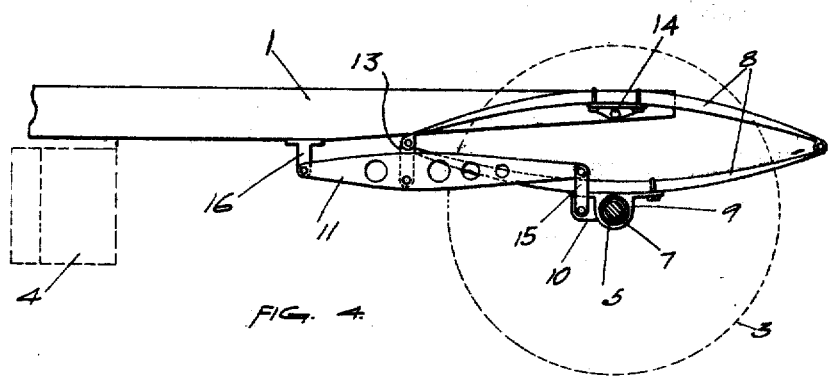

Finally, in Fig. 6, the general arrangement of the several parts is the same as in Fig. 4, but with this difference, viz:—the rear end of bar 11 is extended a little farther so that the link 15 may be connected with a lug 21, projecting to the rear of spring seat 9, or just oppositely to the lug 10; instead of a link 13 between the bar and the front end of the spring, a pin 22 and slot 23 are employed to connect these parts; and the front end of the bar is attached to the frame through the medium of a universal joint 24 that takes the place of the simple bracket 16. It will be understood that such a joint may be substituted at other points in this, as well as in each of the previously described structures; as also that the pin and slot type of connection is in its mechanical effects the same as the previously described link, not only at the point of connection between spring and bar but elsewhere. Similarly, any of the joints may be made universal, if found desirable. The modified features of construction characterizing Fig. 6, it may be stated, are more fully described and claimed in a separate copending application filed Oct. 3, 1911, Serial No. 652561.

In all the preceding forms of construction, exemplifying the invention, not only are material advantages secured in the manner in which torque and thrust are taken up, as has already been explained; but also, and of considerable importance, is the fact that the housing of the rear axle is preserved in substantially horizontal alinement throughout its whole length of movement as the spring is compressed and again expanded. This condition is exactly preserved in the construction of Fig. 1, and to a substantial degree in each of the other forms shown, and is a result that, so far as we are aware, is obtained in no analogous construction heretofore devised. As a result of this feature, in the normal loaded condition of the vehicle, the motor spindle 18, the drive shaft 19, and the spindle-section 20 carried by the differential housing 6, are in substantial alinement, insuring their most efficient operation and materially lessening wear on the connecting joints.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In a vehicle, the combination of the vehicle frame; a wheel axle; a housing for such axle; an elliptic spring supporting said frame upon said housing; and a member connected with said housing and with said frame at a point spaced from the point of attachment of said spring to said frame, one end of said spring being also connected to said member.

2. In a vehicle, the combination of the vehicle frame; a wheel axle; a housing for such axle; an elliptic spring supporting said frame upon said housing; and a rigid member connected with said housing and with said frame, one end of said spring being connected to said member at a point intermediate of the ends of the latter.

3. In a vehicle, the combination of the vehicle frame; a wheel axle; a housing for such axle; an elliptic spring supporting said frame upon said housing; and a member having its ends pivotally connected with said housing and frame, respectively, one end of said spring being pivotally connected with said member at a point intermediate between its ends.

4. In a vehicle, the combination of the vehicle frame; a wheel axle; a housing for such axle; an elliptic spring supporting said frame upon said housing; and a member connecting said housing with said frame, one end of said spring being also connected with said member, one of the connections between said member and said housing, frame and spring being a linked connection.

5. In a vehicle, the combination of the vehicle frame; a wheel axle; a housing for such axle; a full elliptic spring supporting said frame upon said housing; and a member connecting said housing with said frame, one end of said spring being also connected with said member, two of the connections between said member, housing, frame and spring being linked connections.

6. In a vehicle, the combination of the vehicle frame; a wheel axle; a housing for such axle; a full elliptic spring supporting said frame upon said housing; and a member pivotally connected at its one end to said housing and having a linked pivotal connection at its other end with said frame, one end of said spring being also pivotally connected with said member.

7. In a vehicle, the combination of the vehicle frame; a wheel axle; a housing for such axle; a full elliptic spring supporting said frame upon said housing; a member directly pivotally connected at one end with said housing and having a linked pivotal connection at its other end with said frame; and a link connecting one end of said spring with said member.

8. In a vehicle, the combination of the vehicle frame; a wheel axle; a housing for such axle; a full elliptic spring supporting said frame upon said housing; and a member, substantially equal in length to said spring, connecting said housing with said frame, one end of said spring being connected with approximately the mid point of said member.

9. In a vehicle, the combination of the vehicle frame; a wheel axle; a housing for such axle; a full elliptic spring supporting said frame upon said housing; and a member, substantially equal in length to said spring, connecting said housing with said frame, one end of said spring being connected with approximately the mid point of said member, two of the connections between said member, housing, frame and spring being linked connections.

10. In a vehicle, the combination of the vehicle frame; a wheel axle; a housing for such axle; a full elliptic spring supporting said frame upon said housing; and a member substantially equal in length to said spring, connected at its one end to said housing and having a linked pivotal connection at its other end with said frame, one end of said spring being also pivotally connected with approximately the mid point of said member.

11. In a vehicle, the combination of the vehicle frame; a wheel axle; a housing for such axle; a full elliptic spring supporting said frame upon said housing; a member, substantially equal in length to said spring, directly pivotally connected at one end with said housing and having a linked pivotal connection at its other end with said frame; and a link connecting one end of said spring with approximately the mid point of said member.

12. In a vehicle, the combination of the vehicle frame; a live wheel axle; a housing for such axle; a motor supported by said frame; a drive-shaft from said motor connected with said axle through differential gearing mounted in said casing; a full elliptic spring supporting said frame upon said housing; and a bar connecting said housing with said frame, the forward end of said spring being also connected with said bar.

13. In a vehicle, the combination of the vehicle frame; a live wheel axle; a housing for such axle; a motor supported by said frame; a drive-shaft from said motor connected with said axle through differential gearing mounted in said casing; a full elliptic spring supporting said frame upon said housing; and a bar pivotally connected at its rear end to said housing and having a linked pivotal connection at its front end with said frame, the forward end of said spring being also pivotally connected with said bar.

14. In a vehicle, the combination of the vehicle frame; a live wheel axle; a housing for such axle; a motor supported by said frame; a drive-shaft from said motor connected with said axle through differential gearing mounted in said casing; a full elliptic spring supporting said frame upon said housing; and a bar, substantially equal in length to said spring, connecting said housing with said frame, one end of said spring being connected with approximately the mid point of said bar.

15. In a vehicle, the combination of the vehicle frame; a live wheel axle; a housing for such axle; a motor supported by said frame; a drive-shaft from said motor connected with said axle through differential gearing mounted in said casing; a full elliptic spring supporting said frame upon said housing; a bar, substantially equal in length to said spring, directly pivotally connected with said housing and having a linked pivotal connection at its other end with said frame; and a link connecting one end of said spring with approximately the mid point of said member.

Signed by us, this 26th day of November, 1910.

DE WITT C. COOKINGHAM.
JOHN H. HERTNER.

Attested by—
ANNA L. GILL,
JNO. F. OBERLIN.